United States Patent [19]

Lanza

[11] 4,153,645

[45] May 8, 1979

[54] HIGH-IMPACT POLYSTYRENE AND PROCESS FOR THE PRODUCTION THEREOF

[75] Inventor: Emmanuel Lanza, Brussels, Belgium

[73] Assignee: Labofina S. A., Brussels, Belgium

[21] Appl. No.: 914,766

[22] Filed: Jun. 12, 1978

Related U.S. Application Data

[62] Continuation-in-part of Ser. No. 778,113, Mar. 16, 1977, abandoned, which is a continuation of Ser. No. 577,924, May 15, 1975, abandoned.

[51] Int. Cl.² ............................................. C08L 9/06
[52] U.S. Cl. ............................................. 260/876 R
[58] Field of Search ................................... 260/876 R

[56] References Cited

U.S. PATENT DOCUMENTS

| 3,592,878 | 7/1971 | Kromolicki et al. | 260/876 R |
| 3,663,656 | 5/1972 | Ford et al. | 260/876 R |

FOREIGN PATENT DOCUMENTS

| 1669701 | 6/1967 | Fed. Rep. of Germany. |
| 1141210 | 6/1966 | United Kingdom. |
| 1349235 | 4/1974 | United Kingdom. |

*Primary Examiner*—Carman J. Seccuro
*Attorney, Agent, or Firm*—Robert J. Koch

[57] ABSTRACT

An improved high-impact polystyrene is disclosed comprising a blend of a polystyrene having a large rubber particle size and a polystyrene having a very fine rubber particle size, combined in such proportions that an improved balance of properties is achieved. Preferably, each polystyrene graft copolymer is prepared by a mass-suspension polymerization process and has a specific degree of grafting.

24 Claims, 4 Drawing Figures

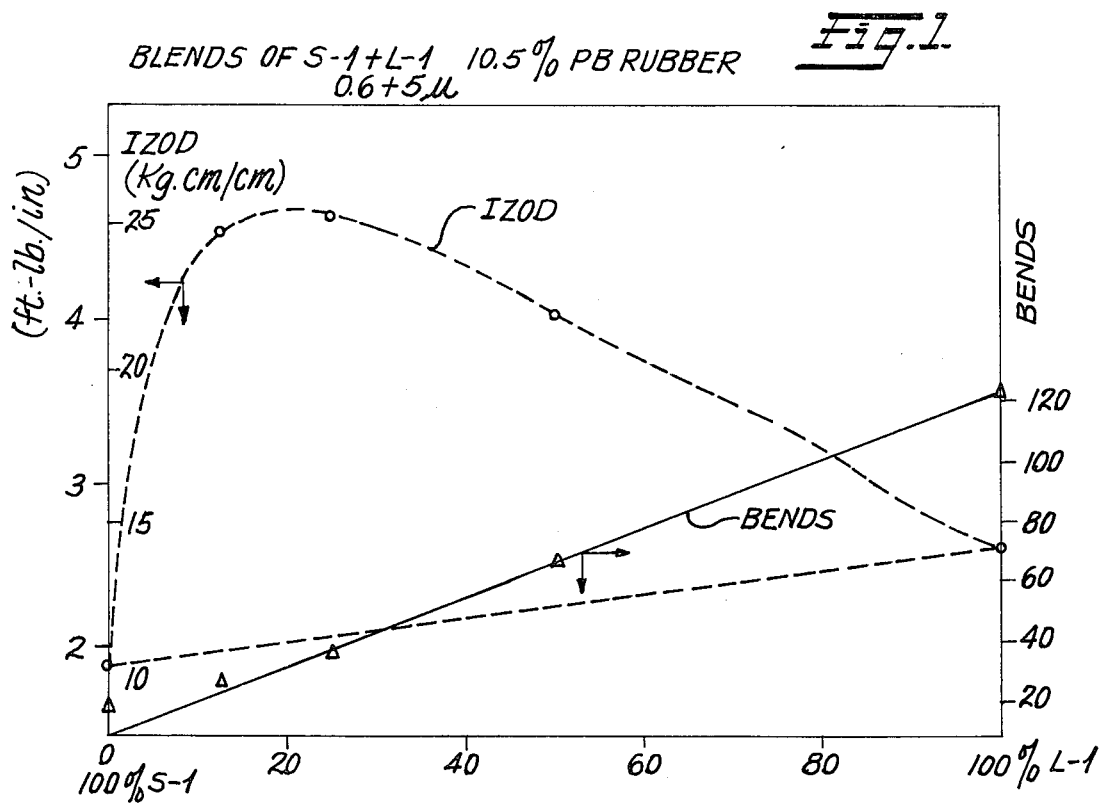
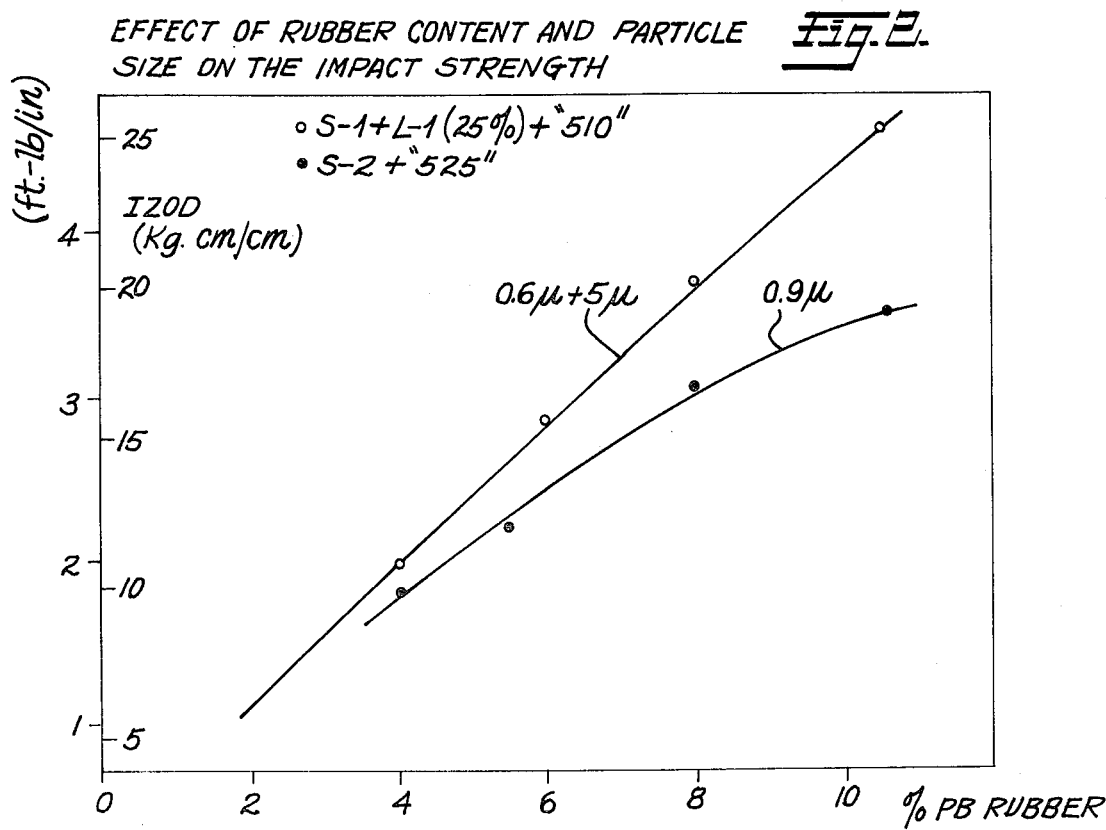

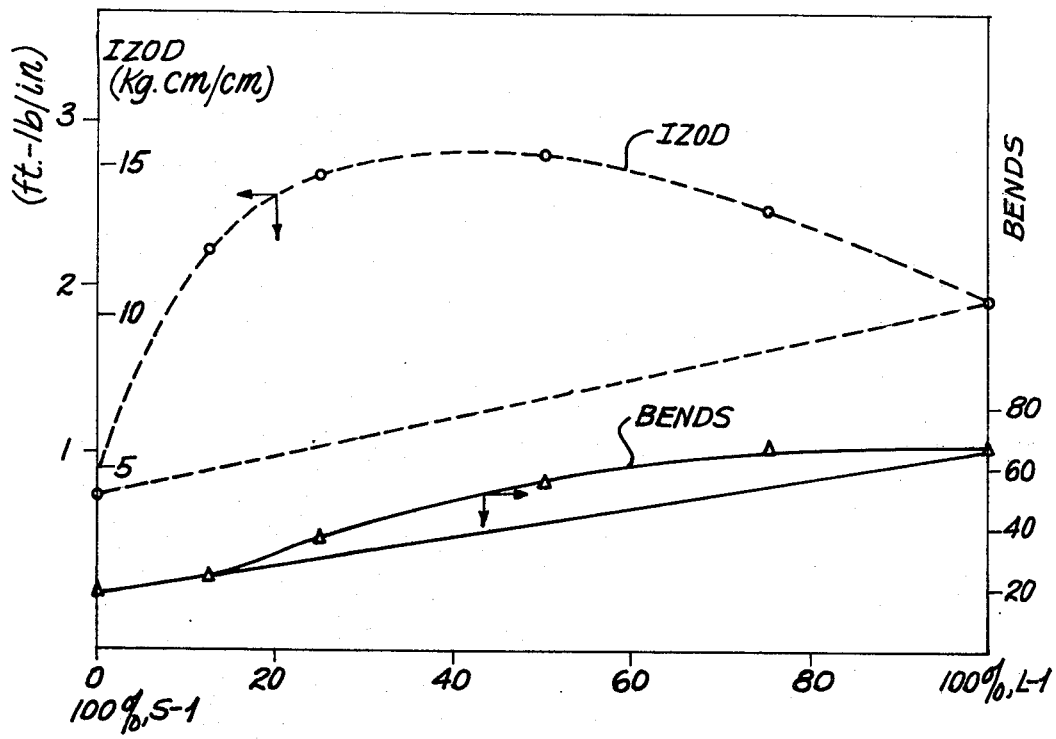
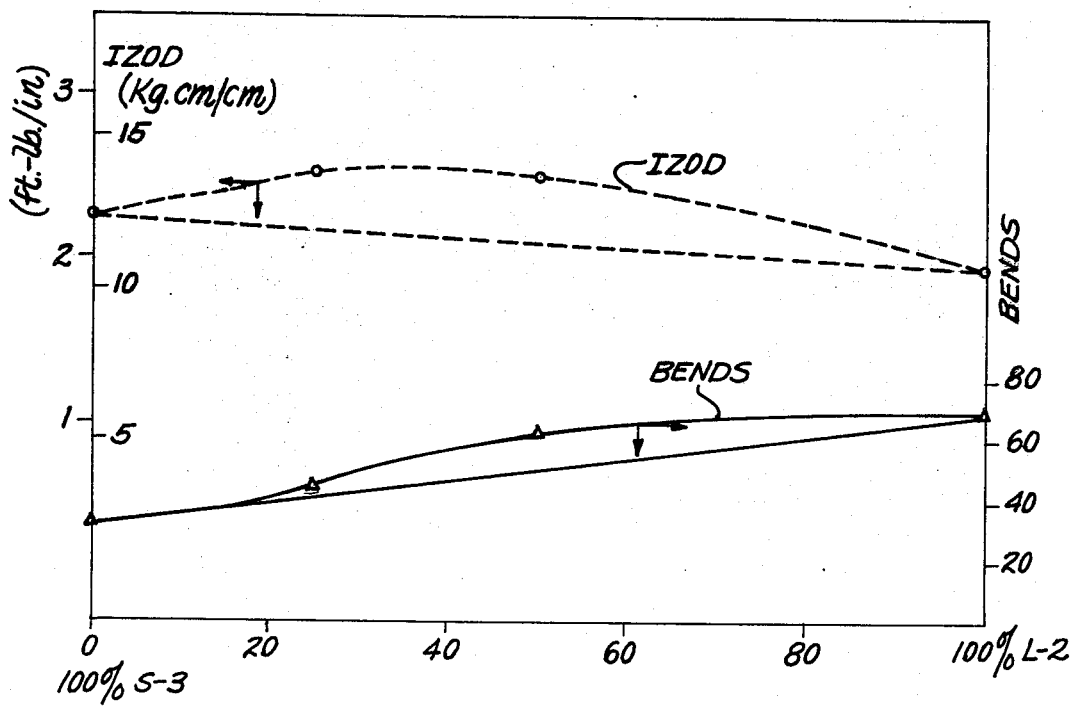

HIGH-IMPACT POLYSTYRENE AND PROCESS FOR THE PRODUCTION THEREOF

CROSS-REFERENCE TO RELATED APPLICATIONS

The present application is a continuation-in-part of co-pending application, Ser. No. 778,113, filed Mar. 16, 1977, which in turn is a continuation of application, Ser. No. 577,924, filed May 15, 1975, both now abandoned.

BACKGROUND OF THE INVENTION

The invention relates to polystyrene molding compositions and more particularly to polystyrene compositions with high-impact strength produced by a mass-suspension polymerization process. The impact resistance, as well as the tensile and flexural strength, elongation, and bends values of certain polystyrene molding compositions enable broad application and wide usage of these polystyrenes in fields where strength, durability, and ease of manufacture are desired. Accordingly, polystyrenes possessing these properties are conventionally molded in sheet form and structural form, designed and adaptable as packaging structures, housings, support structures, furniture, molded articles, toys, architectural trim, and the like. Greatly improved polystyrenes having high-impact strength, elongation, and bends values are achieved by the discovery of a relationship between the rubber particle size of the styrene copolymer, and the aforementioned physical properties of the composition. It has also been discovered that a relationship exists between the degree of grafting of the rubber particles and the physical properties of the composition, particularly, as in the preferred embodiment of the present invention, when the polystyrene graft copolymers are produced by a mass-suspension polymerization process. Appreciation of these relationships permits realization of the invention by the selection of a specific ratio of an impact-resistant polystyrene having a small rubber particle size and a polystyrene having a large rubber particle size with particular degrees of grafting. Thus, a blended polystyrene composition with surprisingly improved properties such as impact resistance, tensile and flexural strength, high elongation and bends values is achieved.

It is well known that impact-resistant polystyrenes have been prepared by incorporating emulsion polymerized synthetic rubbers in styrene monomer and subjecting the mixture to polymerization. Although the brittleness of the polystyrene material is reduced to a certain degree, by this process, the corresponding increase in impact resistance is generally insufficient in many instances to satisfy the conditions to which a general purpose polystyrene is subjected in common use. Moreover, the improved impact resistance is not achieved without a substantial sacrifice in one or more other, sometimes equally important, properties.

Similarly, it is taught in the prior art that the particle size of the rubber which is incorporated into the styrene polymer, has a high influence on the impact resistance of the composition. For a given rubber content, the impact resistance tested for samples of elastomer particle size varying from 0.5 to 5$\mu$, pass through a maximum at 1$\mu$ size.

Compositions of large particles (i.e., 5$\mu$) are generally prepared in order to promote properties such as flexibility and elongation.

Molding compositions, in general, have been subjected to many processing changes and variations in molecular weight, rubber content, rubber particle size, and the like, in an attempt to achieve a proper balance of important physical properties. For instance, U.S. Pat. Nos. 3,652,721 and 3,663,656, relating to ABS resins, teach an emulsion polymerization technique capable of producing ABS polymer particles having different sizes in a single polymerization cycle, and a single reactor. ABS resins of improved properties are produced by this single-batch polymerization process. Moreover, U.S. Pat. No. 3,663,656, teaches that in order to improve the physical properties of the polystyrene composition, the small particle graft copolymer must have a superstrate to substrate ratio of from about 45–100:100, and that the large particle graft copolymer must have a superstrate to substrate ratio of 15–40:100. It is further taught that the failure to observe the degree of grafting within these levels precludes improvement of the physical properties of the composition.

Similarly, U.S. Pat. No. 3,592,878, describes a ternary blend of a high cis polystyrene graft copolymer having a rubber particle size of 0.5 to 30 microns, a high trans polystyrene graft copolymer having a rubber particle size of 1,000 to 3,000 Å units, and a styrene polymer or copolymer. The high cis large particle graft copolymer is prepared by a mass polymerization process, and the high trans small particle graft copolymer is prepared by an emulsion polymerization process. After the preparation of each component polymer, the two graft copolymers are mechanically blended with the styrene polymer to produce the product composition.

While the processing techniques taught in each of the foregoing patents achieve a certain improvement in the physical properties of the resulting polystyrene compositions, the requirement of an emulsion polymerization process renders each of these processes undesirable in actual use. The large difficulties in recovering the resultant copolymers from the aqueous medium and in controlling the degree of grafting upon the rubber particle while in emulsion discourages the use of processing techniques requiring an emulsion polymerization on a commercial basis.

Other similar examples of processing techniques which have been employed in an attempt to improve physical properties have been described in Japan in patent application Nos. 33,305 and 7,123,145 and in Germany by way of application Nos. 2,101,650 and 2,161,136, also for ABS compositions.

SUMMARY OF THE INVENTION

In accordance with this invention, it has now been found that improved properties of high-impact polystyrene can be obtained with a blended polystyrene composition of polystyrene having very fine rubber particles and polystyrene having larger rubber particles. Surprisingly, the blended polystyrene compositions of this invention possess physical properties improved to a greater extent than would be expected. Presented graphically, with the blend ratio plotted on the horizontal axis, and impact resistance and/or bends values plotted on the vertical axis (see FIGS. 1, 3, and 4), the blended compositions according to this invention produce values higher than those expected from the direct linear relationship. The curve has a high slope when there is a high content of fine particles and goes through a maximum for a 50–85% fine particles to 15–50% large particle size range. Accordingly, an object of this invention is to provide high-impact polystyrene molding compositions having improved impact resistance and bends values without suffering a decrease in the balance of other desirable physical properties. A further object of this invention is to provide high-impact polystyrene molding compositions having extra-high impact resistance and extra-high bends values without loss of other desirable physical properties. Another object of this invention is to provide a process for blending polystyrenes having large rubber particle size with or without crystal polystyrene, in specific amounts to yield a high-impact polystyrene molding composition with improved physical properties.

A specific object of the present invention is the provision of an impact resistant polyblend having improved physical properties, in which the component polymers may be produced in a mass-suspension polymerization process.

Other aspects, objects, and the several advantages of this invention will be readily apparent to those skilled in the art, from the description, drawings, and appended claims.

Broadly, the high-impact polystyrenes of the present invention comprise a blend of polystyrene having fine rubber particle size (i.e., 0.9 micron or less), and polystyrene having larger particle size. The process for manufacturing such a high-impact polystyrene is carried out by preparing, on the one hand, a polystyrene having fine rubber particles, following suitable operating and stirring conditions, and, on the other hand, a polystyrene having larger rubber particles, following different operating conditions. Thereafter, these two types of polystyrenes are ultimately mixed in well-defined proportions before extruding and/or other final processing.

The rubber particles present in impact-resistant polystyrene are usually polybutadiene rubbers, which can be produced having a wide range of elastomer particle size. According to the present invention, the small particle size rubber is lower than 1 micron, with a range of from about 0.2 to 0.9 micron rubbers and more particularly between 0.5 and 0.9 micron rubbers being preferred.

Particularly valuable results are obtained when the size of the larger particle is at least 1.5 times the size of the small particle, for instance, when the larger particle size rubber is 1 micron or higher if the small particle size rubber is 0.6 micron. The size of the larger particle is varying between 0.9 and 5 microns, generally between 2 and 5 microns.

The small rubber particle styrene graft polymer and the larger rubber particle styrene graft polymer can be prepared by any process well known to those skilled in the art, such as, for example, emulsion, suspension, or mass. In the preferred embodiment of the instant invention, due to its ease of processing, and the superior properties of the resulting product polymer, a mass-suspension polymerization process is employed. In accordance with the inventive concepts of the present invention, applicant has discovered that, in contradiction to the teachings of the prior art, the degree of grafting of the large rubber particle graft copolymer must be high when a mass-suspension system is utilized in order to accrue optimum improvement in the physical properties of the composition. Applicant has found that best results are obtained, when a mass-suspension polymerization process is employed, if the small rubber particle graft copolymer has a superstrate to substrate ratio of from about 65-125:100, and the large rubber particle graft copolymer has a superstrate to substrate ratio of from about 140-180:100.

Since the surprisingly improved results of the present invention are achieved by the blending of the polystyrene having small and larger rubber particle sizes, respectively, the selection of proper blending ratios is important for obtaining the most optimum physical properties. Accordingly, it has been found that greater amounts of small particle size rubber containing polystyrenes are preferred in the blended molding compositions. For example, blends containing from 50-85% of polystyrene having small rubber particle size and from 15-50% of polystyrene having larger rubber particle size demonstrate the highest impact strengths, as well as high bends and elongation values, in addition to excellent tensile and flexural strengths. Even more preferred are blends of 65-85% small and 15-35% larger rubber particle-containing polystyrenes.

In addition to the selection of the proper ratio of polystyrenes having large and small rubber particle sizes, respectively, an optimum balance of properties is achieved by adjustment of the total rubber content in the composition blend. In accordance with the present invention, the blended polystyrene composition contains from about 2 to about 12% rubber and preferably from about 6 to about 10.5% rubber. The highest impact strength and bends values are obtained with the high levels of rubber, such as 10.5%. Adjustments can be made in the total rubber content by adding crystal polystyrene, in the blending stage, to the impact-resistant polystyrenes having large and small rubber particles. In this manner, polystyrene without rubber, in effect, dilutes the rubber content to the desired values, for instance 8%, 6%, or any other values to produce the final composition of balanced properties.

Of course, other materials, such as plasticizers, and the like may be added to the compositions of the invention. It is especially interesting to add mineral oil in amounts ranging from 2-5% of the total composition for its plasticizing effects.

BRIEF DESCRIPTION OF THE DRAWINGS

Blends of polystyrene having small rubber particle size and polystyrene having larger rubber particle size are graphically represented in FIG. 1. The horizontal axis shows the ratio of large and small rubber particle polystyrenes in the blend samples ranging from 100% small rubber particle size on the far left to 100% larger rubber particle size on the far right side of the graph. Plotted against the various ratios of the blends on the vertical axis are the impact-resistance values and bends values, the former shown by the broken lines, the latter by continuous lines. As indicated previously, the physical properties of the blended polystyrenes according to this invention (curved line), are always greater than the expected values (straight line).

FIG. 2, also a graphic representation, demonstrates the relationship between the impact strength and the total rubber amount of compositions containing 25% of the rubber in the form of 5 micron size particles and 75% of the rubber in the form of 0.6 micron size particles. A similar representation has also been illustrated giving the relationship between the impact strength and the total rubber content of blends where the rubber is in the form of 0.9 micron size particles. It can be quickly seen that compositions prepared according to the present invention result in an increasing linear relationship between the reported values, while blends containing rubber of a single particle size lead to lower and progressively levelling-off values.

However, difficulties are encountered for manufacturing by grafting polystyrenes having a high rubber content and it results that the blended polystyrene compositions of the present invention have generally a rubber content which does not exceed about 12%.

FIG. 3 is a graphic representation of physical properties of another blend of polystyrenes having small and larger rubber particle sizes, respectively. The blends tested were all of a 6% total rubber content, and yielded impact strength values showing a trend similar to those observed for the blends represented in FIG. 1 having 10.5% rubber.

In FIG. 4, measured physical properties for blends of polystyrenes having small and larger particle sizes, respectively, were again plotted as in FIGS. 1 and 3, but the small rubber particle size in these samples was 0.9 micron. The graph indicates that the impact strength was found to be improved to a considerable extent, though somewhat lower than the values for blends containing the same rubber content and small rubber particles of 0.6 micron particle size.

While the information given in the graphs of FIGS. 1-4 is generally self-explanatory, specific details of the compositions, processing conditions, and testing methods are more fully explained hereinafter in the preferred embodiments and examples of the invention.

DETAILED DESCRIPTION OF THE PREFERRED EMBODIMENTS

The polystyrenes having small rubber particle sizes and those having larger rubber particles sizes are prepared by any of the conventional techniques for producing by grafting impact-resistant polystyrenes, for example, bulk polymerization, solution polymerization, suspension polymerization, and emulsion polymerization. These polystyrenes are produced from styrene monomer and rubber polymers. It is conventional to incorporate the rubber in the styrene monomer, and then to subject the mixture to polymerization conditions, thereby producing polystyrene with graft copolymerized rubber.

It is essential to successful practice of the present invention, however, that the polymerization conditions be adjusted to control the degree of grafting of the rubber particles, as applicant has found that the amount of grafting has a significant effect on the physical properties of the polystyrene compositions. When an emulsion polymerization process is employed, the small particle graft copolymer will generally have a superstrate to substrate ratio of about 45-100:100, and the large particle graft copolymer will be relatively lightly grafted, with a superstrate to substrate ratio of about 15-40:100. As is well known in the art, the amount of grafting may be controlled by varying the polymerization conditions, such as the stirring speed, polymerization temperature, etc. to achieve the desired degree of grafting.

In the preferred embodiment, however, a mass-suspension polymerization process is preferably employed to produce each of the component polymers of the instant compositions, as this type of polymerization process realizes desirable processing advantages not available with emulsion polymerization, as well as superior product quality when compared with a sole suspension polymerization. Surprisingly, applicant has discovered that, when a mass-suspension polymerization is utilized to produce the large particle graft copolymer, the rubber particle must be highly grafted, with a superstrate to substrate ratio of 140-180:100, in order to obtain optimum improvement in the physical properties of the polystyrene compositions. The grafting of the small rubber particle graft polymer must also be controlled within a narrow range, a superstrate to substrate ratio of from about 65-125:100, having been found to give best results. Through careful observance of the foregoing grafting percentages for each graft copolymer, the present invention thus enables the considerably simpler mass-suspension polymerization process to be utilized, while at the same time achieving a polystyrene blend having properties comparable to a similar blend prepared by an emulsion process.

As examples of the rubber incorporated into the polystyrene for impact resistance, natural rubber and, in most instances, synthetic rubber may be mentioned. The synthetic rubbers are polymers of conjugated dienes containing from 4 to 6 carbon atoms, more particularly polymers of 1,3-butadiene, isoprene, or 2,3-dimethyl-1,3-butadiene. Stereospecific polymers having a regular molecular structure containing 1,4 units and with a low proportion of 1,2 addition product are preferably used. The relative proportion of rubber in the polystyrene may be varied over wide limits, the most optimum proportions being between about 1 to about 15% of rubber to polystyrene.

The compositions, according to the present invention, can be mechanically blended by any of the conventional blending techniques, as long as the particle size relationship, rubber content, and proper ratios are observed. Thus, blending can be performed by mechanical working, for instance, in a Banbury mixer, in a mill, or in an extruder. The mixer or vessel may be charged with the desired proportion of impact-resistant polystyrenes having the required rubber particle sizes, and it may be additionally charged with a crystal polystyrene, such as any of the commercially-available polystyrenes. It is noted that by crystal polystyrene is meant: polystyrene without rubbery elastomer incorporated therein. The coblending of crystal polystyrene with the various impact-resistant polystyrenes enables the rubber content of the composition to be controlled. Of course, the rubber content can also be controlled and varied by blending selected impact-resistant polystyrenes having various rubber contents.

Several examples are set forth hereinbelow, to more fully describe the invention and its preferred embodiments. In the accompanying Tables I-IV, the composition of each sample tested is given in part A of the Table, and the properties of the sample in part B of the Table. Unless otherwise stated, all quantities are expressed in terms of parts by weight. The testing methods and data were obtained and listed according to the ASTM method given as follows, unless otherwise stated:

| | |
|---|---|
| Min. Oil: | "true" percent in the final sample (the mineral oil is acting as a plasticizer) |
| MFI: | melt flow index (200° C - 5 kg) |
| F.D.: | falling dart (is used, together with Izod for evaluating the impact strength) |
| T.S.: | tensile strength |
| U.T.S.: | ultimate tensile strength |
| Mod.: | modulus |
| El.: | elongation |
| F.S.: | flexural strength |

| | The following ASTM methods were used: |
|---|---|
| M.F.I.: | ASTM D 1238 |
| Vicat temperature or softening temperature: | ASTM D 1525 (heating rate; 50±5° C./ (hr.) |
| Izod (immediate or aged): | ASTM D 256 |
| Tensile: | ASTM D 638 |
| Flexural: | ASTM D 790 |
| Crystal polystyrenes are designated by the numbers: | 500, 501, 510, 525. |

EXAMPLE 1

A molding composition according to the present invention was prepared by thoroughly blending in an extruder 12.5 to 50 parts of a polystyrene, designated L-1, having larger rubber particles, and 87.5 to 50 parts of polystyrene, designated S-1, having small rubber particles. The polymer blends were then injection molded to form test samples, and the physical properties were measured and recorded.

For comparison, test samples of 100 parts L-1 polystyrene and 100 parts S-1 polystyrene, respectively, were also produced, under the same conditions as the polystyrene blend.

Values, namely the impact resistance and bends values, measured for each of the high impact polystyrenes were then plotted in graphic representation (FIG. 1). At the right side of the graph, values for the 100% L-1 polystyrene are listed, while at the left side of the graph, values for the 100% S-1 polystyrene are indicated. A straight line is shown connecting the values for the L-1 and S-1 polystyrenes, as it would be expected that mixtures of L-1 and S-1 polystyrenes would give impact resistance values falling directly on this line for the respective percentages of L-1 and S-1. But, it was surprisingly shown that the polystyrene blend containing 12.5 parts of L-1 and 87.5 parts S-1 had values greater than expected and which actually fall on the curved dotted line above the straight line. Similarly, the values for impact resistance displayed by blends containing higher amounts of L-1, were always greater than the expected ones.

The polystyrene designated S-1, having rubber particles of very fine size, was prepared by adding 42 kg of styrene monomer in a deaerated dissolving tank, followed by 5.14 kg of finely divided rubber (Solprene 201, a product of Petrochim N.V., Antwerp, Belgium). The mixture was stirred for 12 hours at room temperature and at 90 rpm, after which the reactor was closed and deaerated with nitrogen prior to the mass polymerization cycle.

Dithiobis (benzothiazole) (hereinafter called thiofide) as chain transfer agent, in an amount of 13.8 g, was dispersed in 300 g of styrene and added to the reactor. This was followed by the addition of mineral oil as plasticizer in an amount of 965 g.

The vessel was deaerated and heated to 110° C. under stirring at a rate of 225 rpm. Upon reaching 110° C., 4.2 g tert-butylperbenzoate catalyst was added. After phase inversion occurred, tert-dodecylmercaptan, chain transfer agent, was added in an amount of 33.6 g. The mass prepolymer was ready for suspension when a viscosity of 20,000 centipoises was reached and when the total styrene content of the mass prepolymer was adjusted to 40 kg.

The suspension mixture was prepared from 40 kg water, 515 g trisodium phosphate, 674 g calcium chloride, 37 g calcium hydroxide, and 240 g of a 2.85% of soap solution. After the mass was suspended, 40 g of tert-butyl perbenzoate were added. The mixture was heated at 112° C. during 5 hours, after which time 11 g of dicumyl peroxide and 6.4 g of calcium hydroxide were added to the mixture. A final heating step at 132°C. for 3 hours produced the polystyrene molding composition with a rubber particle size of 0.6 micron.

A portion of the polymer was molded into samples for testing purposes, while the remaining portion was blended with various other polystyrenes, according to the process of the invention. The molded samples possessed physical properties as indicated by the data listed in Table I.

The polystyrene designated L-1 having large rubber particle size, was prepared in a process similar to the above, with larger rubber particle size being achieved by a decreased stirring rate during the mass cycle, as well as by increasing the amount of chain transfer agent, as compared to the process for the production of polystyrenes having very fine rubber particle size. The details are as follows: 42 kg of styrene monomer was added to a dissolving tank, which has been deaerated with nitrogen, followed by 5.14 kg of finely divided rubber (Solprene 201). The mixture was stirred at 90 rpm for 12 hours at room temperature (about 20° C.), after which the reactor was closed and deaerated with nitrogen to prepare it for the mass polymerization cycle.

Thiofide, as chain transfer agent, was dispersed in 300 g of styrene monomer in an amount of 48.3 g and added to the reactor. The reactor was again deaerated with nitrogen and heated to 105° C. under stirring at 180 rpm. When the temperature reaches 105° C., 12.6 g of tert-butylperbenzoate catalyst was added. After phase inversion occurred, tert-dodecylmercaptan was added in an amount of 44.5 g and the temperature was increased to 112° C. The mass prepolymer was then allowed to reach a viscosity of between 7,000 and 8,000 centipoises.

In a separate vessel, a suspension mixture was prepared from 14 kg water, 515 g trisodium phosphate, 719 g calcium chloride, and 37 g calcium hydroxide. After the total styrene content of the mass prepolymer was adjusted to 40 kg, mineral oil, in an amount of 920 g was added to the reactor. The suspension mixture was then added to the prepolymerization reactor, charged with 26 kg water, 240 g of a 2.85% soap solution, and 40 g of tert-butylperbenzoate catalyst. The mixture was heated at 112° C. during 5 hours, after which time 11 g dicumylperoxide and 6 g calcium hydroxide were added.

The mixture was then heated at 132° C. during 3 hours. After the polymerization was completed, the polymer was removed from the reaction vessel and a portion of it was molded into samples for testing purposes, while the remaining portion was blended with various other polystyrenes, according to the process of the invention. The samples possessed physical properties as indicated by the data given in Table I.

Blends of 87.5 to 50 parts of S-1 and 12.5 to 50 parts of L-1 were worked up for comparative testing and the values plotted as shown in FIG. 1. From the graph it can be seen that unexpectedly high values of impact resistance were obtained for all the blends. The graph also indicates that optimum impact resistance values are achieved with polystyrenes containing between about 15 and about 30 parts of L-1. The actual values obtained in this series of experiments are listed in Table I.

EXAMPLE 2

A second polystyrene, designated S-2, with very fine rubber particle size, was produced by a process similar to that described for the production of S-1. The stirring rate used in the mass polymerization step was 200 rpm, and the amount of mineral oil was 534 g. Thiofide, as chain transfer agent, was added in an amount of 23 g. When the temperature reached 110° C., 8.4 g of tert-butylperbenzoate catalyst was added. After phase inversion occurred, 32.2 g of tert-dodecylmercaptan, chain transfer agent, were added to the reactor. This process modification yielded a final polystyrene molding composition having a rubber particle size of 0.9 micron and physical properties as indicated by the data given in Table I.

Samples of varying rubber content were worked up from S-2 blended with the appropriate amount of "crystal" polystyrene (Cosden 525, a product of Cosden Oil and Chemical Co., Big Spring, Tex. U.S.A.) in order to test the impact resistance of the compositions. Thus, a series of blends having 8.5, 5, and 4% rubber levels were prepared, tested, and the values plotted as shown in FIG. 2, along with the value corresponding to the starting 10.6% rubber polystyrene.

In order to demonstrate the results achieved by the present invention, a series of blends having 8.6 and 4% rubber levels were prepared from 75 parts of S-1 and 25 parts of L-1 blended with the appropriate amount of "crystal" polystyrene (Cosden 510). The molded samples were tested and the physical properties listed in Table II along with the value corresponding to the blend of the starting 10.5% rubber S-1 and L-1 polystyrenes. The impact resistance values were plotted as shown in FIG. 2. It can be easily seen that compositions prepared according to the present invention from S-1 and L-1 polystyrenes result in an increase of the linear relationship between the impact resistance and the rubber amount of the blends.

From FIG. 2 it can also be seen that blends prepared from S-2 polystyrene, having rubber particle size of 0.9 micron, lead to lower and progressively levelling-off values. Furthermore, Table I indicates that S-2 polystyrene displays the highest impact resistance among a large series of synthesized, single particle size polystyrenes.

EXAMPLE 3

In this example, polystyrene blends with 6% rubber content were produced to determine the optimum amounts of polystyrene having large rubber particle size and polystyrene having small rubber particle size. Thus, polystyrene S-1, having small rubber particle size was blended with polystyrene L-1, having large rubber particle size. The 6% rubber content of the blends was achieved, as described in Example 2, by the addition of crystal polystyrene (in this series Cosden 501).

Four blends of 87.5 to 25 parts of S-1 and 12.5 to 75 parts of L-1, as well as the blends of the same rubber level only containing S-1 or L-1 rubber particles, were worked up for comparative testing. The measured values for the physical properties of the blends are given in Table III. Impact resistance and bends values were plotted as shown in FIG. 3.

As described in previous examples, it was surprisingly found that the blended polystyrenes containing both large and small rubber particle size had physical properties superior to polystyrenes of equal rubber content and containing only either large or small particle size.

The actual values obtained are represented in FIG. 3. The predicted values would fall on the straight lines on the graph of FIG. 3.

In addition to demonstrating the results achieved by the present invention, this example also indicates the optimum range of large particle size rubber to small particle size rubber polystyrenes in such blends. More particularly, the highest points of the impact resistance values of the dotted curve in FIG. 3 appear to be between 25 to 50 parts of L-1 and between 75 to 50 parts of S-1.

EXAMPLE 4

A third polystyrene, designated S-3, with very fine rubber particle size, was produced by a process nearly identical to that described for the production of S-2 in Example 2; the only difference being in the mass polymerization steps, where the stirring rate was 180 rpm instead of 200 rpm, and the amount of tert-dodecylmercaptan chain transfer agent was 36.4 g instead of 32.2 g. This process modification yielded a mass prepolymer viscosity of 16,000 centipoises and a final polystyrene molding composition having a rubber particle size of 0.9 micron and physical properties as indicated in Table I.

A second polystyrene, designated L-2, with large rubber particle size, was accomplished in a process similar to that given for the production of L-1 in Example 1, except that in the mass polymerization cycle 16.8 g of tert-butylperbenzoate catalyst and a stirring rate of 170 rpm were used. The tert-dodecylmercaptan chain transfer agent was divided into two portions of respectively 20.2 g and 24 g. These portions were added to the reactor after the phase inversion and just prior to the suspension step, respectively. This process modification gave a mass prepolymer viscosity of 17,000 centipoises and a final polystyrene molding composition having a rubber particle size of 4 microns and physical properties as listed in Table I.

Several blends of S-3 and L-2 polystyrenes were prepared at a rubber level of 6%. The blends were worked up for testing purposes as in Example 3, and the physical properties for such blend series are listed in Table III and plotted in FIG. 4. The "crystal" polystyrene coblended with the S-3 and L-2 samples is Cosden 500. Here again, the curved lines in FIG. 4 giving the actual impact resistance and bends values clearly show that higher than expected values for the blends of this invention were obtained. The preferred range of L-2 to S-3 polystyrene in this particular series is from about 25 to 50%, the highest impact resistance value being obtained with about 30% of L-2.

EXAMPLE 5

A series of blends of polystyrene S-1 and L-2 having rubber particle size of 0.6 and 4 microns, respectively, were prepared by blending these polystyrenes with the appropriate amount of crystal polystyrene Cosden 525. The blends were worked up at a rubber level of 5.6%. Three blends of 75 to 25 parts of S-1 and 25 to 75 parts of L-2, as well as the blends of the same rubber level only containing S-1 or L-2 rubber particles, were prepared for comparative testing. The values for the respective physical properties are indicated in Table IV. There again, it can be seen from the results that higher than expected impact resistance and bends values were obtained, the highest impact resistance values being obtained in a range of 25 to 50% of L-2 polystyrene.

EXAMPLE 6

As demonstrated in Example 1 (see FIG. 1), blends of small and large rubber particle size can be prepared at a rubber level of 10.5% by blending the appropriate amounts of synthesized polystyrenes, in this case in the absence of added crystal polystyrene. Super-high-impact-resistant polystyrenes were thus obtained, as previously shown in Table I (samples 2 to 4).

To further demonstrate the results achieved by the present invention, several different blends of polystyrenes having large rubber particle size and polystyrenes having small rubber particle size, were worked up from samples L-3, L-4, S-4 and S-5, produced in processes similar to those described in Examples 1 to 4. The values for the respective physical properties measured on blends with S-1, S-2, and L-1 polystyrenes, are indicated in Table IV.

Larger amounts of mineral oil can be added at the blending stage. The normal mineral oil content of about 2.6 was increased in the sample No. 37 to 4%. In this case, an even greater impact resistance was recorded, as can be easily seen from comparison between values of sample No. 37 to those already described for sample No. 3 (see Table I).

Polystyrene S-4, having a rubber particle size of 0.5 micron, was blended with 25 parts of polystyrene L-4, having a rubber particle size of 3 microns (sample No. 38). All those compositions, as well as those described for sample No. 34 to 36, displayed impact resistance values higher than those expected from the values of the polystyrene containing only one type of rubber particles.

Polystyrene containing small rubber particles are brittle. For instance, polystyrene having a rubber particle size of 0.24 micron was blended with crystal polystyrene 525 and with a mineral oil. This mixture containing 10.5% by weight of polybutadiene and 2.34% by volume of mineral oil had an impact resistance (aged) of only 2.3 kg. cm/cm.

A similar blend was also prepared from a mixture of this polystyrene having a rubber particle size of 0.24 micron and of a polystyrene having a rubber particle size of 0.5 micron. The impact resistance was scarcely improved.

A further similar blend was prepared from polystyrene having a rubber particle size of 0.24 micron in admixture with a polystyrene having a rubber particle size of 1 micron. The Izod impact resistance was 11.4.

Other similar blends were prepared from polystyrene having a rubber particle size of 0.24 micron in admixture with varying amounts of polystyrene having a rubber particle size of 5 microns, the polybutadiene content of the blends being 10.5% (by weight) and the mineral oil content being comprised between 2.0 and 2.5% (by volume). The results were the following:

| Amount of polystyrene having a rubber particle size of 5 microns (% by weight) | Izod (kg. cm/cm) Aged |
|---|---|
| — | 2.3 |
| 12.5% | 14.0 |
| 25.0% | 16.8 |
| 50.0% | 17.8 |

These results clearly show that a large particle elastomer promotes a striking increase in Izod impact resistance. This improvement is already remarkable when the concentration of this elastomer is as low as 12.5% (based on the weight of polystyrene having a small particle size).

It can also be seen that the impact resistance of polystyrene having a small rubber particle size S lower than 1 micron is increased by blending said polystyrene with a polystyrene having a larger rubber particle size L, when L is at least 1.5 time S and is at least 0.9 micron.

EXAMPLE 7

In order to demonstrate the effect of the degree of grafting of the rubber particles upon the physical properties of the blends of the instant invention, two blends of small particle graft polymer and large particle graft polymer differing only in degree of grafting of the large particle graft polymer are prepared by mass-suspension similarly to the method described in Example 1, and are tested for impact strength. Blend I comprises 75% of a graft polystyrene polymer having a particle size of 0.24 microns and a superstrate to substrate ratio of 67:100, and 25% by weight of a large particle polystyrene graft polymer having a particle size of 1.0 micron and a superstrate to substrate ratio of 120:100. Blend II is identical in composition to Blend I with the exception that the large particle graft polymer has a superstrate to substrate ratio of 40:100 (as required in U.S. Pat. No. 3,663,656). The Izod impact for each of these compositions is as follows:

| Blend | Izod Impact (kg cm/cm) |
|---|---|
| I (120% large particle grafting) | 21 |
| II (40% large particle grafting) | 13 |

The foregoing comparative experiment clearly demonstrates that the large particle graft polymer must be relatively highly grafted when the polymer is prepared by a mass-suspension process in contradiction to the teachings of U.S. Pat. No. 3,663,656.

Table V describes the rubber particle size and percent of grafting (superstrate to substrate ratio) of each of the graft copolymers employed in the blends of Example 1–6 and Tables I–IV. By reading Tables I–IV in conjunction with Table V, it is further demonstrated that blends prepared from mass-suspension graft copolymers having a relatively highly grafted large rubber particle exhibit outstanding physical properties, particularly those blends prepared from small particle graft copolymers having a superstrate to substrate ratio of 65–125:100, and a large particle graft copolymer having a superstrate to substrate ratio of 140–180:100.

While the invention has been particularly shown and described with reference to the preferred embodiments thereof, it will be understood by those skilled in the art, that various changes in the form and details may be made therein, without departing from the spirit and scope of the invention.

TABLE I

A) Composition

| Sample No. | Sample Content | Polybutadiene % | Polybutadiene φ(μ) | Min. Oil (%) |
|---|---|---|---|---|
| 1 | S-1 | 10.5 | 0.6 | 2 |
| 2 | S-1 + L-1 (12.5%) | 10.5 | 0.6+5 | 2 |
| 3 | S-1 + L-1 (25%) | 10.5 | 0.6+5 | 2 |
| 4 | S-1 + L-1 (50%) | 10.5 | 0.6+5 | 2 |
| 5 | L-1 | 10.5 | 5 | 2 |
| 6 | S-2 | 10.6 | 0.9 | 1.12 |
| 7 | S-3 | 10.6 | 0.9 | 1.12 |
| 8 | L-2 | 10.5 | 4 | 2 |
| 9 | L-3 | 10.5 | 5 | 2 |
| 10 | L-4 | 10.5 | 3 | 2 |
| 11 | S-4 | 10.5 | 0.5 | 2 |
| 12 | S-5 | 10.5 | 0.6 | 2 |

B) Physical Properties

| Sample No. | MFI (g/10') | Vicat A (°C.) | Izod (Kg cm/cm) Imm. | Izod (Kg cm/cm) Aged | F.D. (in.-lb.) | Tensile (Kg/cm²) T.S. | Tensile (Kg/cm²) U.T.S. | Tensile Mod ×10⁴ | El. (%) | Flexural F.S. | Flexural Mod ×10⁴ | Bends |
|---|---|---|---|---|---|---|---|---|---|---|---|---|
| 1 | 1.16 | 95.0 | 10.6 | 10.3 | 17 | 215 | 204 | 1.80 | 39 | 498 | 2.16 | 21 |
| 2 | 1.29 | 95.7 | 25.7 | 24.7 | 20 | 213 | 211 | 1.64 | 43 | 466 | 1.99 | 28 |
| 3 | 1.25 | 95.7 | 24.5 | 25.1 | 18 | 204 | 209 | 1.57 | 45 | 445 | 1.97 | 37 |
| 4 | 1.42 | 95.5 | 22.2 | 21.8 | 18 | 184 | 203 | 1.45 | 55 | 421 | 1.87 | 66 |
| 5 | 1.75 | 95.1 | 15.0 | 14.1 | 8 | 153 | 185 | 1.26 | 55 | 375 | 1.57 | 123 |
| 6 | 0.70 | 99.1 | 19.3 | 19.1 | 19 | 205 | 207 | 1.53 | 54 | 454 | 1.87 | 26 |
| 7 | 1.03 | 99.1 | 17.8 | 17.7 | 21 | 201 | 207 | 1.55 | 55.3 | 436 | 1.82 | 42 |
| 8 | 2.50 | 95.8 | 15.1 | 14.9 | 7 | 152 | 183 | 1.31 | 54.3 | 374 | 1.64 | 165 |
| 9 | 0.77 | 96.6 | 15.7 | 15.7 | 17 | 156 | 193 | 1.36 | 55.8 | 374 | 1.63 | 125 |
| 10 | 2.36 | 95.0 | 15.8 | 14.5 | 8 | 167 | 179 | 1.34 | 47 | 383 | 1.68 | 89 |
| 11 | 1.55 | 95.2 | 10.1 | 11.7 | 12 | 229 | 218 | 1.76 | 45 | 515 | 2.27 | 36 |
| 12 | 3.21 | 93.2 | 12.5 | 10.8 | 19 | 219 | 200 | 1.74 | 37.3 | 485 | 2.16 | 27 |

TABLE II

A) Composition

| Sample No | Sample Content | Polybutadiene % | Polybutadiene φ(μ) | Min. Oil (%) |
|---|---|---|---|---|
| 13 | S-1 + L-1 (265%) + "510" | 4 | 0.6+5 | 2.63 |
| 14 | " | 6 | 0.6+5 | 2.43 |
| 15 | " | 8 | 0.6+5 | 2.24 |
| 16 | S-2 + "525" | 4 | 0.9 | 1.35 |
| 17 | " | 5.5 | 0.9 | 1.30 |
| 18 | " | 8 | 0.9 | 1.21 |

B) Physical Properties

| Sample No | MFI (g/10') | Vicat A (°C.) | Izod (Kg cm/cm) Imm. | Izod (Kg cm/cm) Aged | F.D. (in.-lb) | Tensile (Kg/cm²) T.S. | Tensile (Kg/cm²) U.T.S. | Tensile Mod ×10⁴ | El. (%) | Flexural F.S. | Flexural Mod ×10⁴ | Bends |
|---|---|---|---|---|---|---|---|---|---|---|---|---|
| 13 | 3.90 | 94.0 | 10.4 | 10.8 | — | 260 | 259 | 2.14 | 40 | 593 | 2.76 | 27 |
| 14 | 2.88 | 94.5 | 15.5 | 2 | 2 | 232 | 235 | 1.92 | 49 | 542 | 2.42 | 34 |
| 15 | 1.86 | 95.1 | 20.0 | 20.1 | 6 | 211 | 221 | 1.80 | 45.3 | 487 | 2.26 | 40 |
| 16 | 2.37 | 98.9 | 10.7 | 9.9 | — | 287 | 286 | 2.20 | 47 | 681 | 2.74 | 14 |
| 17 | 1.96 | 98.8 | 13.2 | 12.0 | 1 | 282 | 276 | 2.07 | 44 | 606 | 2.50 | 22 |
| 18 | 1.25 | 98.4 | — | 16.7 | 1 | 234 | 235 | 1.81 | 44 | 561 | 2.28 | 23 |

TABLE III

A) Composition

| Sample No | Sample Content | Polybutadiene % | Polybutadiene φ(μ) | Min. Oil (%) |
|---|---|---|---|---|
| 19 | S-1 + "501" | 6 | 0.6 | 3.54 |
| 20 | S-1 + L-1 (12.5%) + "501" | 6 | 0.6+5 | 3.54 |
| 21 | S-1 + L-1 (25%) + "501" | 6 | 0.6+5 | 3.54 |

TABLE III-continued

| | | | | | |
|---|---|---|---|---|---|
| 22 | S-1 + L-1 (50%) + "501" | 6 | 0.6+5 | 3.54 | |
| 23 | S-1 + L-1 (75%) + "501" | 6 | 0.6+5 | 3.54 | |
| 24 | L-1 | 6 | 5 | 3.54 | |
| 25 | S-3 | 6 | 0.9 | 1.93 | |
| 26 | S-3 + L-2 (25%) + "500" | 6 | 0.9+4 | 2.05 | |
| 27 | S-3 + L-2 (50%) + "500" | 6 | 0.9+4 | 2.18 | |
| 28 | L-2 | 6 | 4 | 2.43 | |

B) Physical Properties

| Sample No | MFI (g/10') | Vicat A (°C.) | Izod (Kg cm/cm) Imm. | Izod Aged | F.D. (in.-lb.) | Tensile (Kg/cm²) T.S. | U.T.S. | Mod $\times 10^4$ | El. (%) | Flexural F.S. | Mod. $\times 10^4$ | Bends |
|---|---|---|---|---|---|---|---|---|---|---|---|---|
| 19 | 4.82 | 91.1 | 4.6 | 4.0 | <1 | 240 | 210 | 1.98 | 37 | 514 | 2.59 | 19 |
| 20 | 5.14 | 91.1 | 12.1 | 12.2 | <1 | 217 | 211 | 1.97 | 40 | 510 | 2.58 | 23 |
| 21 | 5.60 | 91.0 | 14.8 | 14.6 | 1 | 211 | 209 | 1.92 | 37 | 488 | 2.53 | 36 |
| 22 | 6.06 | 91.0 | 15.0 | 15.3 | 1 | 197 | 204 | 1.86 | 46 | 470 | 2.36 | 55 |
| 23 | 6.58 | 90.7 | 13.0 | 13.6 | 1 | 184 | 203 | 1.78 | 46 | 451 | 2.29 | 67 |
| 24 | 6.70 | 91.0 | 10.8 | 10.6 | 1 | 177 | 202 | 1.75 | 49 | 436 | 2.26 | 67 |
| 25 | 3.02 | 97.1 | 11.9 | 12.3 | <1 | 224 | 242 | 1.95 | 44.5 | 392 | 2.45 | 32 |
| 26 | 3.45 | 96.8 | 12.7 | 13.7 | 1 | 226 | 241 | 1.86 | 48 | 542 | 2.36 | 44 |
| 27 | 3.69 | 96.8 | 12.7 | 13.6 | 1 | 211 | 231 | 1.86 | 48 | 522 | 2.33 | 63 |
| 28 | 4.46 | 95.0 | 10.7 | 10.6 | 1 | 193 | 223 | 1.76 | 42 | 484 | 2.25 | 70 |

TABLE IV

A) Composition

| Sample No | Sample content | Polybutadiene % | φ (μ) | Min. Oil (%) |
|---|---|---|---|---|
| 29 | S-1 + "525" | 5.6 | 0.6 | 1.77 |
| 30 | S-1 + L-2 (25%) + "525" | 5.6 | 0.6+4 | 1.77 |
| 31 | S-1 + L-2 (50%) + "525" | 5.6 | 0.6+4 | 1.77 |
| 32 | S-1 + L-2 (75%) + "525" | 5.6 | 0.6+4 | 1.77 |
| 33 | L-2 + "525" | 5.6 | 4 | 1.77 |
| 34 | S-1 + L-3 (12.5%) | 10.5 | 0.6+5 | 2 |
| 35 | S-4 + L-1 (12.5%) | 10.5 | 0.5+5 | 2 |
| 36 | S-5 + L-1 (25%) | 10.5 | 0.6+5 | 2 |
| 37 | S-1 + L-1 (25%) | 10.28 | 0.6+5 | 4 |
| 38 | S-4 + L-4 (25%) | 10.5 | 0.5+3 | 2 |

B) Physical Properties

| Sample No | MFI (g/10') | Vicat A (°C.) | Izod (Kg cm/cm) mm. | Izod Aged | F.D. (in.-lb.) | Tensile (kg/cm²) T.S. | U.T.S. | Mod $\times 10^4$ | El. (%) | Flexural F.S. | Mod. $\times 10^4$ | Bends |
|---|---|---|---|---|---|---|---|---|---|---|---|---|
| 29 | 2.14 | 96.4 | 3.8 | 4.0 | <1 | 265 | 256 | 2.12 | 43 | 593 | 2.68 | 14 |
| 30 | 2.36 | 97.0 | 15.7 | 16.0 | <1 | 251 | 256 | 1.95 | 46 | 581 | 2.43 | 37 |
| 31 | 2.72 | 97.0 | 15.1 | 15.6 | 1 | 236 | 257 | 1.95 | 53 | 560 | 2.37 | 34 |
| 32 | 2.93 | 97.0 | 12.6 | 12.6 | 1 | 227 | 256 | 1.90 | 52 | 558 | 2.32 | 42 |
| 33 | 3.14 | 97.1 | 10.3 | 10.5 | 1 | 215 | 252 | 1.86 | 56 | 539 | 2.29 | 47 |
| 34 | 1.13 | 95.7 | 24.1 | 24.3 | 20 | 211 | 212 | 1.75 | 47 | 489 | 2.04 | 39 |
| 35 | 1.48 | 95.4 | 23.9 | 25.1 | 18 | 207 | 209 | 1.80 | 48 | 478 | 2.12 | 42 |
| 36 | 2.71 | 94.3 | 22.4 | 22.6 | 20 | 192 | 193 | 1.64 | 46 | 438 | 2.00 | 66 |
| 37 | 1.74 | 90.2 | 27.0 | 26.3 | 22 | 175 | 169 | 1.60 | 41 | 397 | 2.00 | 53 |
| 38 | 1.61 | 95.0 | 23.4 | 24.5 | 22 | 212 | 206 | 1.69 | 48.3 | 468 | 2.10 | 52 |

TABLE V

| Polystyrene Graft Copolymer | Degree of Grafting | φ Rubber (micron) |
|---|---|---|
| S1 | 113:100 | 0.6 |
| S2 | 125:100 | 0.9 |
| S3 | 119:100 | 0.9 |
| S4 | 110:100 | 0.5 |
| S5 | 112:100 | 0.6 |
| fines (emulsion) | 67:100 | 0.24 |
| L1 | 150:100 | 5 |
| L2 | 155:100 | 4 |
| L3 | 144:100 | 5 |
| L4 | 156:100 | 3 |

What is claimed is:

1. A high impact polystyrene composition with improved physical properties, comprising a blend of:
   a. from about 50 to 85% by weight of a diene rubber-modified polystyrene graft copolymer, produced by a mass-suspension polymerization process, having a small rubber particle size S of from about 0.2 to 0.9 microns and a superstrate to substrate ratio of from about 65–125:100; and,
   b. from about 15 to 50% by weight of a diene rubber-modified polystyrene graft copolymer, produced by a mass-suspension polymerization process, having a larger rubber particle size L of at least about 0.9 microns and a superstrate to substrate ratio of from about 140–180:100, L being at least 1.5 times S.

2. The high-impact polystyrene composition of claim 1, wherein said polystyrene graft copolymer having said small rubber particle size S has a rubber particle size of from about 0.5 to 0.9 microns.

3. The high-impact polystyrene composition of claim 1, wherein said polystyrene graft copolymer having said small rubber particle size S has a rubber particle size of about 0.6 microns.

4. The high-impact polystyrene composition of claim 1, wherein said polystyrene graft copolymer having said larger rubber particle size L has a rubber particle size of from about 2 to 5 microns.

5. The high-impact polystyrene composition of claim 1, wherein said polystyrene graft copolymer having said larger rubber particle size L has a rubber particle size of 5 microns.

6. The high-impact polystyrene composition of claim 1, wherein the rubber in each of said graft copolymers comprises polybutadiene.

7. The high-impact polystyrene composition of claim 1, wherein said composition has a total rubber content of from about 2% to 12% by weight of said composition.

8. The high-impact polystyrene composition of claim 1, wherein said composition has a total rubber content of from about 5.6% to about 10.5% by weight of said composition.

9. The high-impact polystyrene composition of claim 1, wherein said graft copolymer having said small rubber particle size S comprises from about 65 to 85% by weight of said composition, and said graft copolymer having said larger rubber particle size L comprises from about 15 to 35% by weight of said composition.

10. The high-impact polystyrene composition of claim 1, wherein said blend further comprises crystal polystyrene.

11. A high-impact polystyrene composition with improved physical properties, comprising a blend of:
    a. from about 50 to 85% by weight of a diene rubber-modified polystyrene graft copolymer, produced by a mass-suspension polymerization process, having a small rubber particle size S of from about 0.5 to 0.9 microns and a superstrate to substrate ratio of from about 65–125:100; and,
    b. from about 15 to 50% by weight of a diene rubber-modified polystyrene graft copolymer produced by a mass-suspension polymerization process, having a larger rubber particle size L of from about 2 to 5 microns and a superstrate to substrate ratio of from about 140–180:100, said composition having a total rubber content of from about 2% to 12% by weight.

12. The high-impact polystyrene composition of claim 11, wherein said blend further comprises crystal polystyrene.

13. The high-impact polystyrene composition of claim 11, wherein the rubber in each of said graft copolymers comprises polybutadiene.

14. The high-impact polystyrene composition of claim 11, wherein said composition has a total rubber content of from about 5.6% to about 10.5% by weight of said composition.

15. The high-impact polystyrene composition of claim 11, wherein said graft copolymer having said small rubber particle size S comprises from about 65 to 85% by weight of said composition, and said graft copolymer having said larger rubber particle size L comprises from about 15 to 35% by weight of said composition.

16. A process for preparing a polystyrene composition having improved physical properties, comprising the steps of:
    a. preparing a diene rubber-modified polystyrene graft copolymer having a small rubber particle size S of from about 0.2 to 0.9 microns and a superstrate to substrate ratio of from about 65–125:100 by a mass-suspension polymerization process;
    b. preparing a diene rubber-modified polystyrene graft copolymer having a larger rubber particle size L of at least about 0.9 microns and a superstrate to substrate ratio of from about 140–180:100, L being at least 1.5 times S, by a mass-suspension polymerization process; and,
    c. mechanically blending from about 50 to 85 parts by weight of said graft copolymer having said small rubber particle size with from about 15 to 85 parts by weight of said graft copolymer having said larger rubber particle size.

17. The process of claim 16, further comprising the step of mechanically blending crystal polystyrene with said graft copolymers in an amount sufficient to produce a polystyrene composition having a total rubber content of between about 2 to 12% by weight.

18. The process of claim 16, further comprising the step of mechanically blending crystal polystyrene with said graft copolymers in an amount sufficient to produce a polystyrene composition having a total rubber content of between about 5.6% to about 10.5% by weight.

19. The process of claim 16, wherein said polystyrene graft copolymer having said small rubber particle size S has a rubber particle size of from about 0.5 to 0.9 microns.

20. The process of claim 16, wherein said polystyrene graft copolymer having said small rubber particle size S has a rubber particle size of about 0.6 microns.

21. The process of claim 16, wherein said polystyrene graft copolymer having said larger rubber particle size L has a rubber particle size of from about 2 to 5 microns.

22. The process of claim 16, wherein said polystyrene graft copolymer having said larger rubber particle size L has a rubber particle size of 5 microns.

23. The process of claim 16, wherein the rubber in each of said graft copolymers comprises polybutadiene.

24. The process of claim 16, wherein from about 65 to 85 parts by weight of said graft copolymer having said small rubber particle size is mechanically blended with from about 15 to 35 parts by weight of said graft copolymer having said larger rubber particle size.

* * * * *